(12) United States Patent
Jutt et al.

(10) Patent No.: US 10,430,355 B1
(45) Date of Patent: Oct. 1, 2019

(54) MIXING RESTARTABLE AND NON-RESTARTABLE REQUESTS WITH PERFORMANCE ENHANCEMENTS

(71) Applicant: INTERNATIONAL BUSINESS MACHINES CORPORATION, Armonk, NY (US)

(72) Inventors: Michael G. Jutt, Fishkill, NY (US); Anthony T. Sofia, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/174,521

(22) Filed: Oct. 30, 2018

(51) Int. Cl.
*G06F 13/20* (2006.01)
*G06F 3/06* (2006.01)

(52) U.S. Cl.
CPC ............ *G06F 13/20* (2013.01); *G06F 3/0656* (2013.01); *G06F 2213/40* (2013.01)

(58) Field of Classification Search
CPC ..... G06F 3/0656; G06F 13/20; G06F 2213/40
See application file for complete search history.

(56) References Cited

U.S. PATENT DOCUMENTS

| | | | |
|---|---|---|---|
| 7,472,129 B2 | 10/2008 | Adya | |
| 7,945,919 B2 | 5/2011 | Hara | |
| 8,896,610 B2 | 11/2014 | Rajendran | |
| 8,898,448 B2 * | 11/2014 | Klingenbrunn | H04L 47/10 713/150 |
| 9,317,317 B2 | 4/2016 | Graham | |
| 2008/0016287 A1 * | 1/2008 | Hepler | H04L 1/0043 711/147 |
| 2012/0303855 A1 * | 11/2012 | Bakke | G06F 13/28 710/308 |
| 2015/0301975 A1 * | 10/2015 | Garg | G06F 13/4221 710/105 |
| 2016/0070714 A1 | 3/2016 | D'Sa | |
| 2018/0095750 A1 * | 4/2018 | Drysdale | G06F 9/5044 |
| 2018/0173420 A1 * | 6/2018 | Li | G06F 3/061 |

(Continued)

OTHER PUBLICATIONS

Bindhammer et al., "Device driver programming in a transactional DSM operating system," Proceedings of the Seventh Asia-Pacific Conference on Computer Systems Architecture Archive (ACSAC'2002), pp. 65-71. 2002.

(Continued)

*Primary Examiner* — Glenn A. Auve
(74) *Attorney, Agent, or Firm* — Cantor Colburn LLP; William Kinnaman

(57) ABSTRACT

A computer-implemented method includes setting a respective flag in a first buffer of a hardware accelerator. The first buffer includes the respective flag of the first buffer, and a second buffer of the hardware accelerator includes a respective flag of the second buffer. A hardware state of the hardware accelerator is maintained in the first buffer, based on the respective flag of the first buffer being set. A first request directed to the hardware accelerator is received. It is determined that that the first buffer has the respective flag set. The first request is passed to the hardware accelerator, where passing the first request includes passing to the hardware accelerator a pointer to the first buffer, based on the first buffer having the respective flag set.

20 Claims, 3 Drawing Sheets

(56) References Cited

U.S. PATENT DOCUMENTS

2018/0314584 A1* 11/2018 Arimilli ................ G06F 11/079
2019/0114499 A1* 4/2019 Delaye ................. G06F 17/153

OTHER PUBLICATIONS

Distler et al., "Efficient state transfer for hypervisor-based proactive recovery," WRAITS '08 Proceedings of the 2nd Workshop on Recent Advances on Intrusion-Tolerant Systems, Article No. 4. Apr. 1, 2008. 6 pages.
Kadav et al., "Fine-grained fault tolerance using device checkpoints," ASPLOS '13 Proceedings of the Eighteenth International Conference on Architectural Support for Programming Languages and Operating Systems, Mar. 16-20, 2013. pp. 473-484.

* cited by examiner

MIXING RESTARTABLE AND NON-RESTARTABLE REQUESTS WITH PERFORMANCE ENHANCEMENTS

BACKGROUND

The present invention relates to hardware accelerators and, more specifically, to mixing restartable and non-restartable requests with performance enhancements.

Hardware acceleration is the performance of certain functions in hardware, such that those functions may potentially be performed more efficiently than they might be if performed in software, or so as to enable the software to focus on other functionality. The hardware used in hardware acceleration may be integrated with a central processing unit (CPU) of a host machine, or that hardware may be a separate device known as a hardware accelerator.

Generally, a hardware accelerator is connected to the CPU, such as through an input/output adapter. Software on the host machine uses a hardware accelerator through one or more libraries, each of which utilize a common interface, through which the software can communicate with a device driver of the hardware accelerator. In other words, the library communicates with the device driver, which communicates with the hardware accelerator. Requests can be executed on the hardware accelerator through the interface. In some cases, however, a request will need to be restarted, potentially on a different hardware accelerator. This may be the case, for example, if the hardware accelerator initially executing the request fails during the execution.

To enable restarts of requests, the interface provides for an input buffer and an output buffer, also referred to respectively as an input state area and an output state area, which are managed by the device driver. Generally, the input buffer and the output buffer are used to maintain input states and output states of the hardware accelerator. To enable restartable requests, the input state existing at the beginning of execution of the request needs to be maintained in the input buffer while a request is being executed by the hardware accelerator. To this end, for instance, the device driver copies the input state from the input buffer to a secondary buffer, and the device driver processes the request using the secondary buffer. The result of the request is written to the output buffer. This maintains the input state in pristine condition in the input buffer. Thus, if the accelerator fails while processing the request, the request can be restarted with its original input state.

Because the output buffer contains the current state of the hardware accelerator after execution of a request, the library will instruct the device driver to swap the input buffer and the output buffer at the conclusion of the request. For instance, a pointer indicating the input buffer can be updated to reference the output buffer, and a pointer indicating the output buffer can be updated to reference the input buffer. As a result, the output buffer becomes the input buffer for the next request received. The acts of writing to the current state to the output buffer and then swapping the input and output buffers occurs at the conclusion of each successful request.

SUMMARY

Embodiments of the present invention are directed to a computer-implemented method for executing requests on a hardware accelerator. A non-limiting example of the computer-implemented method includes setting a respective flag in a first buffer of a hardware accelerator. The first buffer includes the respective flag of the first buffer, and a second buffer of the hardware accelerator includes a respective flag of the second buffer. A hardware state of the hardware accelerator is maintained in the first buffer, based on the respective flag of the first buffer being set. A first request directed to the hardware accelerator is received. It is determined that that the first buffer has the respective flag set. The first request is passed to the hardware accelerator, where passing the first request includes passing to the hardware accelerator a pointer to the first buffer, based on the first buffer having the respective flag set.

Embodiments of the present invention are directed to a system for executing requests on a hardware accelerator. A non-limiting example of the system includes a memory having computer-readable instructions and one or more processors for executing the computer-readable instructions. The computer-readable instructions include instructions for setting a respective flag in a first buffer of a hardware accelerator. The first buffer includes the respective flag of the first buffer, and a second buffer of the hardware accelerator includes a respective flag of the second buffer. Further according to the computer-readable instructions, a hardware state of the hardware accelerator is maintained in the first buffer, based on the respective flag of the first buffer being set. A first request directed to the hardware accelerator is received. It is determined that that the first buffer has the respective flag set. The first request is passed to the hardware accelerator, where passing the first request includes passing to the hardware accelerator a pointer to the first buffer, based on the first buffer having the respective flag set.

Embodiments of the invention are directed to a computer-program product for executing requests on a hardware accelerator, the computer-program product including a computer-readable storage medium having program instructions embodied therewith. The program instructions are executable by a processor to cause the processor to perform a method. A non-limiting example of the method includes setting a respective flag in a first buffer of a hardware accelerator. The first buffer includes the respective flag of the first buffer, and a second buffer of the hardware accelerator includes a respective flag of the second buffer. Further according to the method performed by the processor, a hardware state of the hardware accelerator is maintained in the first buffer, based on the respective flag of the first buffer being set. A first request directed to the hardware accelerator is received. It is determined that that the first buffer has the respective flag set. The first request is passed to the hardware accelerator, where passing the first request includes passing to the hardware accelerator a pointer to the first buffer, based on the first buffer having the respective flag set.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
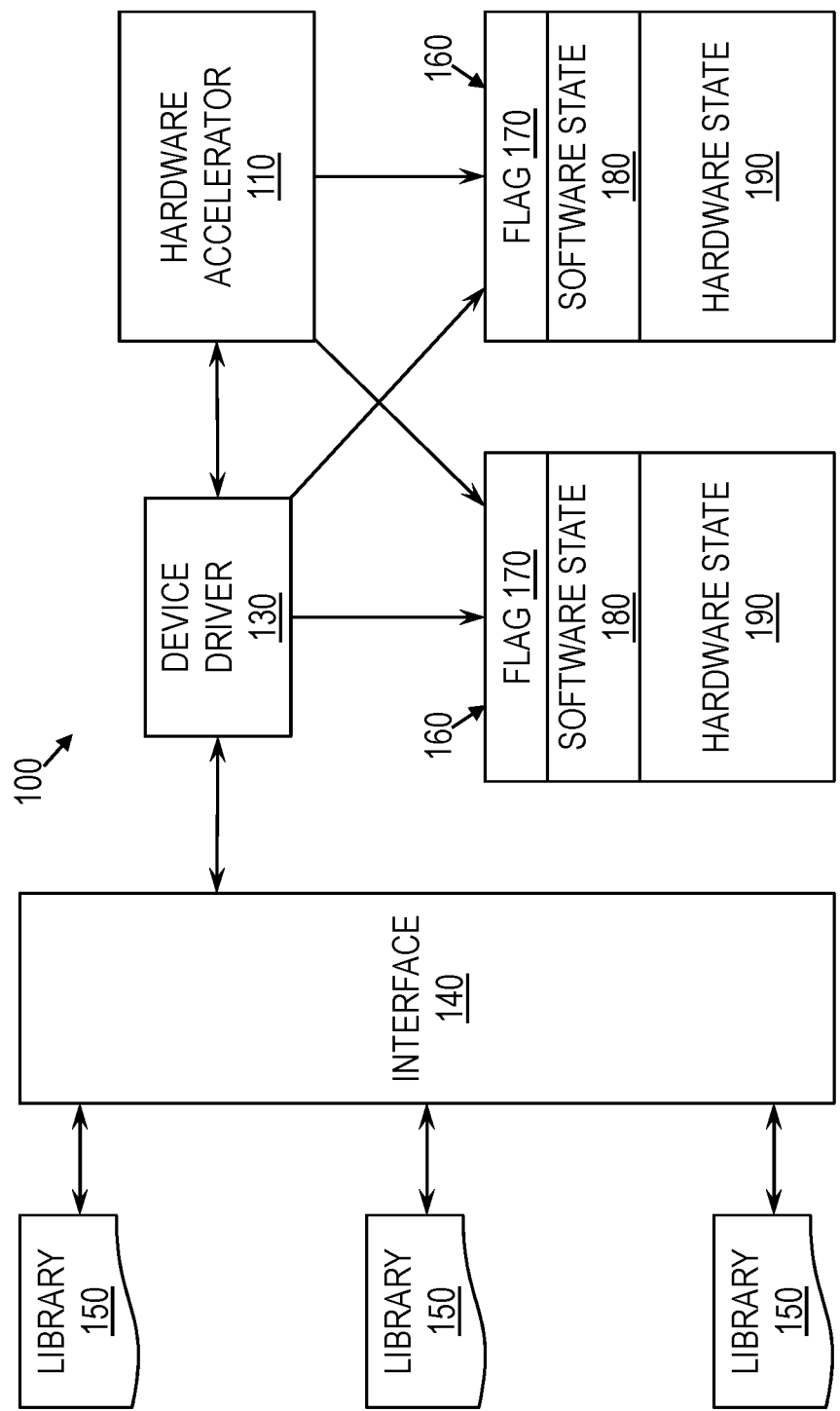
FIG. 1 is a diagram of a request system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, as accelerator technology improves, there is no longer a requirement to swap the input and output buffers from one request to the next. Rather, while a new hardware accelerator may not necessarily support restartable requests, it may be capable of executing requests in place. Writing the complete output state to the output buffer can be an expensive process, because the full output state may be quite large. Thus, for a newer accelerator only a single buffer may be required, and the output state need not be written in full into an output buffer. Further, a new accelerator is likely to be more closely connected to the CPU, resulting in reduced latency and increased throughput. It is desirable to leverage these features.

Turning now to an overview of the aspects of the invention, one or more embodiments of the invention address the above-described shortcomings of the prior art by providing a mechanism to mark, or flag, one of the input and output buffers to indicate that the buffer includes the hardware state. However, the software state may continue to switch back and forth between the two buffers. In some embodiments of the invention, the device driver is able to recognize, based on the flag, which buffer maintains the hardware state and can therefore pass the hardware state to the accelerator, regardless of which buffer is currently acting as the input buffer for maintaining the present software state.

The above-described aspects of the invention address the shortcomings of the prior art by enabling hardware accelerators to process data in place when they are capable of doing so while maintaining backward compatibility with libraries that switch the input and output buffers between requests. By keeping the hardware state in a single buffer, latency can be significantly reduced, as the hardware state tends to be significantly larger than the software state. Further, device drivers of older accelerators can continue to behave as usual, by writing the software state to the output buffer and then swapping the input buffer and the output buffer after executing a request.

Turning now to a more detailed description of aspects of the present invention, FIG. 1 is a diagram of a request system 100 according to some embodiments of the invention. As shown in FIG. 1, the request system 100 may include and be associated with a hardware accelerator 110, which may be installed on, or otherwise integrated with, a host machine. Although not shown in FIG. 1, to take advantage of various features of embodiments of the invention, the host machine may include at least two hardware accelerators 110, thereby enabling a request to be restarted on a second hardware accelerator 110 after a first hardware accelerator 110 fails. However, for the hardware accelerator 110 to operate as intended, it is not required that additional hardware accelerators 110 be present on the host machine.

Each hardware accelerator 110 may have an associated a device driver 130, with which software can communicate via an interface 140, implemented by one or more software libraries 150. The interface 140 enables access to a first buffer 160 and a second buffer 160, each of which is capable of maintaining a state of the hardware accelerator 110. More specifically, in some embodiments of the invention, each buffer 160 may include reserved space for a flag 170, a software state 180, and a hardware state 190 of the hardware accelerator 110. Alternatively, however, only one buffer 160 may include a reserved space for the hardware state 190, while the other buffer 160 includes space only for the flag 170 and the software state 180. In either case, however, both buffers 160 may include reserved space for the flag 170 and the software state 180.

Each library 150 used to access the hardware accelerator may be a new library 150 or a legacy library 150. Generally, after executing a request, a legacy library 150 takes the current output buffer 160 and then switches the input buffer 160 and the output buffer 160, while a new library 150 need not switch the input buffer 160 and the output buffer 160. In some embodiments of the invention, the request system 100 supports both of these library types.

Generally, embodiments of the invention leverage the capabilities of a hardware accelerator 110 that is more closely connected to the CPU than are older hardware accelerators 110. As a result, latency can be reduced, and throughput can be increased. Thus, for such a hardware accelerator 110 it is desirable to optimize requests on the hardware accelerator 110 in order to take advantage of these features. However, conventionally, by writing the full output state to the current output buffer 160 at the conclusion of each request, latency is unnecessarily increased for new hardware accelerators 110. In some embodiments of the invention, a hardware accelerator 110 is able to process data in place and thus does not need a distinct input buffer 160 and output buffer 160. However, legacy libraries 150 exist that will expect these two buffers 160 and will automatically swap them after a request. Thus, embodiments of the invention are backward compatible with such legacy libraries 150 while also supporting new libraries 150 that do not swap the input buffer 160 and the output buffer 160 but, rather, use only a single buffer 160.

To this end, as mentioned above, each buffer 160 may include space for a software state 180, a flag 170, and a hardware state 190, but only a single of these buffers 160 actually maintains the current hardware state 190. Generally, the hardware state 190 may be much larger than the software state 180, and the flag 170 may be implemented by a single bit. In this disclosure, the portion of a buffer 160 reserved for the hardware state 190 is referred to as an extended buffer, while the portion of the buffer 160 reserved for the software state 180 is referred to as the standard buffer 160. In some embodiments of the invention, the software state 180 and the flag 170 are incorporated into the buffer 160 as a header, while the hardware state 190 takes up the remainder of the buffer 160. However, it will be understood that various implementations are available.

Generally, the software state 180 is a current state of software associated with the hardware accelerator 110, while the hardware state 190 is a current state of the hardware of the hardware accelerator 110. Typically, the hardware state 190 is significantly larger than the software state 180. In some embodiments of the invention, it is unnecessary for both the buffers 160 to maintain this large hardware state 190. Rather, in some embodiments of the invention, the flag 170 indicates which buffer 160 maintains the actual hardware state 190. In some embodiments of the invention, the buffer 160 that does not include hardware state 190 may instead include blanked data, such as a series of zeroes.

The library 150 that uses the hardware accelerator 110 may initialize the buffers 160 before executing the first request to the device driver 130. For instance, this may be performed at the instruction of an initialization function implemented by a new library 150. To this end, the device driver 130 may set all bits in each buffer 160 to zero on the first call. The device driver 130 may then flag one of such buffers 160 as maintaining the hardware state 190. More specifically, the device driver 130 may set the flag 170 by changing the flag bit from 0 to 1. This flagged buffer 160 may thus be the only buffer 160 that maintains the hardware state 190 of the hardware accelerator 110.

A newer hardware accelerator 110 need not utilize both an input buffer 160 and an output buffer and may, instead, be capable of performing computations in place. Thus, a new library 150, potentially developed with knowledge of the capabilities of such a new hardware accelerator, need not swap the input buffer 160 and the output buffer 160 after performing a request on the hardware accelerator 110. In some embodiments of the invention, when a new library 150 is utilized to run a request on the hardware accelerator 110, the device driver 130 passes to the hardware accelerator 110 the software state 180 written in the current input buffer 160 and a pointer to the hardware state 190 in the flagged buffer 160, which does not move. While the request is executed, the input buffer 160 is updated, and at the conclusion of the request, the input buffer 160 may still include the current software state 180. After the request is executed, in some embodiments of the invention, the new library therefore does not swap the input buffer 160 and the output buffer 160. Thus, the current input buffer 160 may remain the input buffer 160 for the next request. As a result, the hardware accelerator 110 may operate with reduced latency, because the large hardware state 190 need not be copied by being written to the current output buffer 160.

In some embodiments of the invention, when the device driver 130 receives control again, the device driver 130 knows which buffer 160 is the current input buffer 160. Further, the device driver 130 may determine which buffer 160 has its flag 170 set and, therefore, may determine the location of the hardware state 190. Because legacy libraries 150 still swap the input and output buffers 160, the hardware state 190 is not necessarily stored in the current input buffer 160. The next time a request is received by way of a library, the device driver 130 is able to pass the hardware accelerator 110 the correct software state 180, in the current input buffer 160, and the correct hardware state 190, in the flagged buffer 160.

Each legacy library 150 may continue to swap the input buffer 160 and the output buffer 160 after a request is performed. Further, in some embodiments of the invention, a legacy library 150 need not be concerned with, or even aware of, the existence of the flag 170 and the hardware state 190. Rather, upon completing a request, the device driver 130 may write to the current output buffer 160, specifically, to the software state 180 of the current output buffer 160, while leaving the flag 170 and the hardware state 190 untouched. The legacy library 150 may then switch the input buffer 160 and the output buffer 160.

Thus, when the device driver 130 receives control again, the device driver 130 has access to the current input buffer 160 as well as the current output buffer 160. The device driver 130 may check whether the input buffer 160, as indicated by the library 150 after the switch, has the flag set. If the flag is set, then the device driver 130 knows that the current input buffer 160 maintains the hardware state 190 in addition to the software state 180. However, if the flag is not set in the input buffer 160, then the device driver 130 knows that the current output buffer 160 maintains the hardware state 190. As discussed above, after initialization, the placement of the hardware state does not change, according to some embodiments of the invention.

Figure 2:
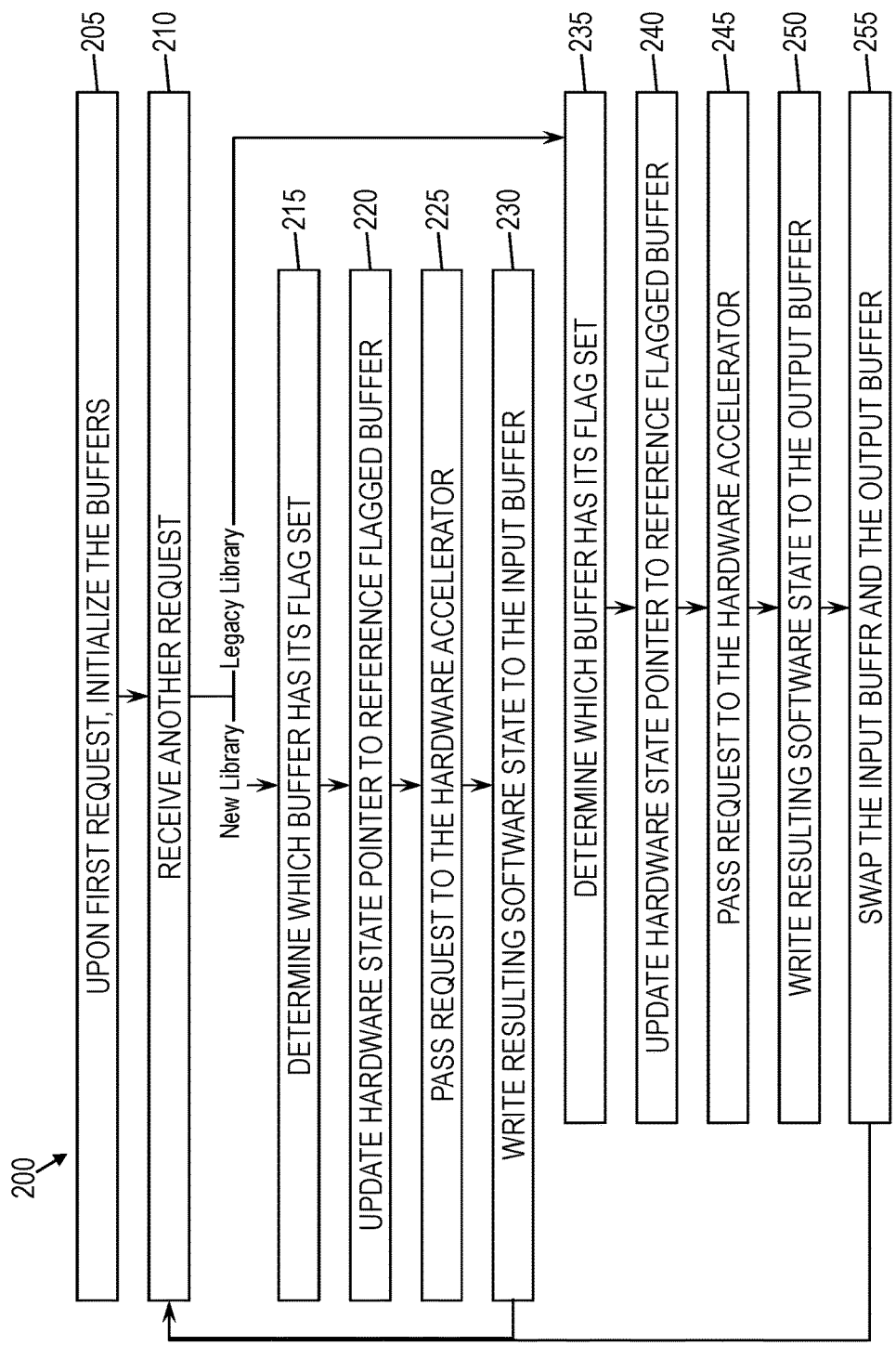
FIG. 2 is a flow diagram of a method of managing both restartable and non-restartable requests through the request system, according to some embodiments of the invention.

FIG. 2 is a flow diagram of an example method 200 of managing both restartable and non-restartable requests through the request system 100, according to some embodiments of the invention. According to some embodiments of the invention, this method 200 enables a hardware accelerator 110 to receive requests via libraries 150 that expect processing to be performed in place, without swapping the input buffer 160 and the output buffer 160, as well as via libraries 150 that expect to swap the input buffer 160 and the output buffer 160. As a result, restartable requests are supported through the use of two distinct buffers 160, and performance is improved through leveraging the capabilities of a hardware accelerator 110 that does not require the swap to occur.

As shown in FIG. 2, at block 205, upon receiving a first request, the device driver 130 initializes the buffers 160 associated with the hardware accelerator 110. To this end, for instance, the device driver 130 can check whether the flag 170 is set in either the current input buffer 160 or the current output buffer 160. If no flag 170 is set in either buffer 160, then the device driver 130 may set the various bits in both buffers 160 to zeroes, thus blanking the buffers 160. Additionally, the device driver 130 may set the flag 170 in the input buffer 160 to a value of 1. At the conclusion of the request, after the input buffer 160 has been updated with an output state, including both an output software state 180 and an output hardware state 190, a subset of the input buffer 160 may be copied to the output buffer 160. More specifically, for instance, this subset may include the software state 180, while excluding the flag 170 and the hardware state 190. Thus, after this first request, the input buffer 160 may have a set flag 170 and may include both the software state 180 and the hardware state 190, while the output buffer 160 has its flag 170 unset and includes the software state 180 but blanked data in place of the hardware state 190. Although the input buffer 160 is flagged in the above example, and thus maintains the hardware state 190, one of skill in the art will understand that the output buffer 160 could be flagged alternatively. In some embodiments of the invention, a new library 150 provides an initialization method, or the like, to instruct the device driver 130 to perform these initialization tasks upon receipt of its first request.

At block 210, after initialization, another request is issued to the hardware accelerator 110 and received at the device driver 130. If the request is made through a new library 150, then the method 200 may proceed to block 215. However, if the request is made through a legacy library 150, then the method 200 may proceed block 235. It will be understood that the device driver 130 need not detect whether the library 150 being used is a legacy library 150 or a new library 150. Rather, depending on the library type, one of these paths will be utilized, according to some embodiments of the invention.

At block 215, when the request has been issued to the hardware accelerator 110 through a new library 150, the device driver 130 determines which buffer 160 has its flag 170 set. At block 220, the device driver 130 adjusts a pointer to the hardware state 190 to point to the hardware state 190 in the buffer 160 with the set flag 170. This may be the input buffer 160 or the output buffer 160, because the buffers 160 may switch from time to time. At block 225, the device driver 130 passes the request to the hardware accelerator 110 for processing. At block 230, while completing the request, the hardware accelerator 110 writes the resulting software state 180 back to the input buffer 160. As such, in some embodiments of the invention, the input buffer 160 maintains the current software state 180, and the flagged buffer 160 maintains the current hardware state 190. The method 200 may then return to block 210, where additional requests are received.

At block 235, when a new request has been issued to the hardware accelerator 110 through a legacy library 150, the device driver 130 determines which buffer 160 has its flag 170 set. At block 240, the device driver 130 adjusts a pointer to the hardware state 190 to point to the hardware state 190 in the buffer 160 with the set flag 170. At block 245, the device driver 130 passes the new request to the hardware accelerator 110 for processing. At block 250, while completing the request, at the instruction of the legacy library 150, the device driver 130 writes the output state to the current output buffer 160. More specifically, in some embodiments of the invention, this output state includes the software state 180 and does not include a flag 170 or the hardware state 190, as the legacy library 150 is unconcerned with the hardware state 190. Thus, at this point, the output buffer 160 may have the current software state 180, and the flagged buffer 160 may maintain the current hardware state 190. At block 255, at the instruction of the legacy library 150, the device driver 130 swaps the input buffer 160 and the output buffer 160. Therefore, in some embodiments of the invention, the new input buffer 160 maintain the current software state 180, and the flagged buffer 160 maintains the current hardware state 190. The method 200 may then return to block 210, where additional requests are received.

It will be understood that, regardless of which library 150 is used to make a request, at the conclusion of processing the request, the input buffer 160 maintains the software state 180 and the flagged buffer 160 maintains the hardware state 190. Further, it will be understood that, regardless of whether the next request arrives through a legacy library 150 or a new library 150, the current input buffer 160 may be used to provide the software state 180, and the flagged buffer 160 may be used to provide the hardware state 190. Thus, regardless of which library 150 is used, the hardware accelerator 110 will operate as intended. This enables a newer hardware accelerator 110 to be used effectively by taking advantage of reduced latency and thus improved performance, while also maintaining backward compatibility, including the support for restartable requests.

Figure 3:
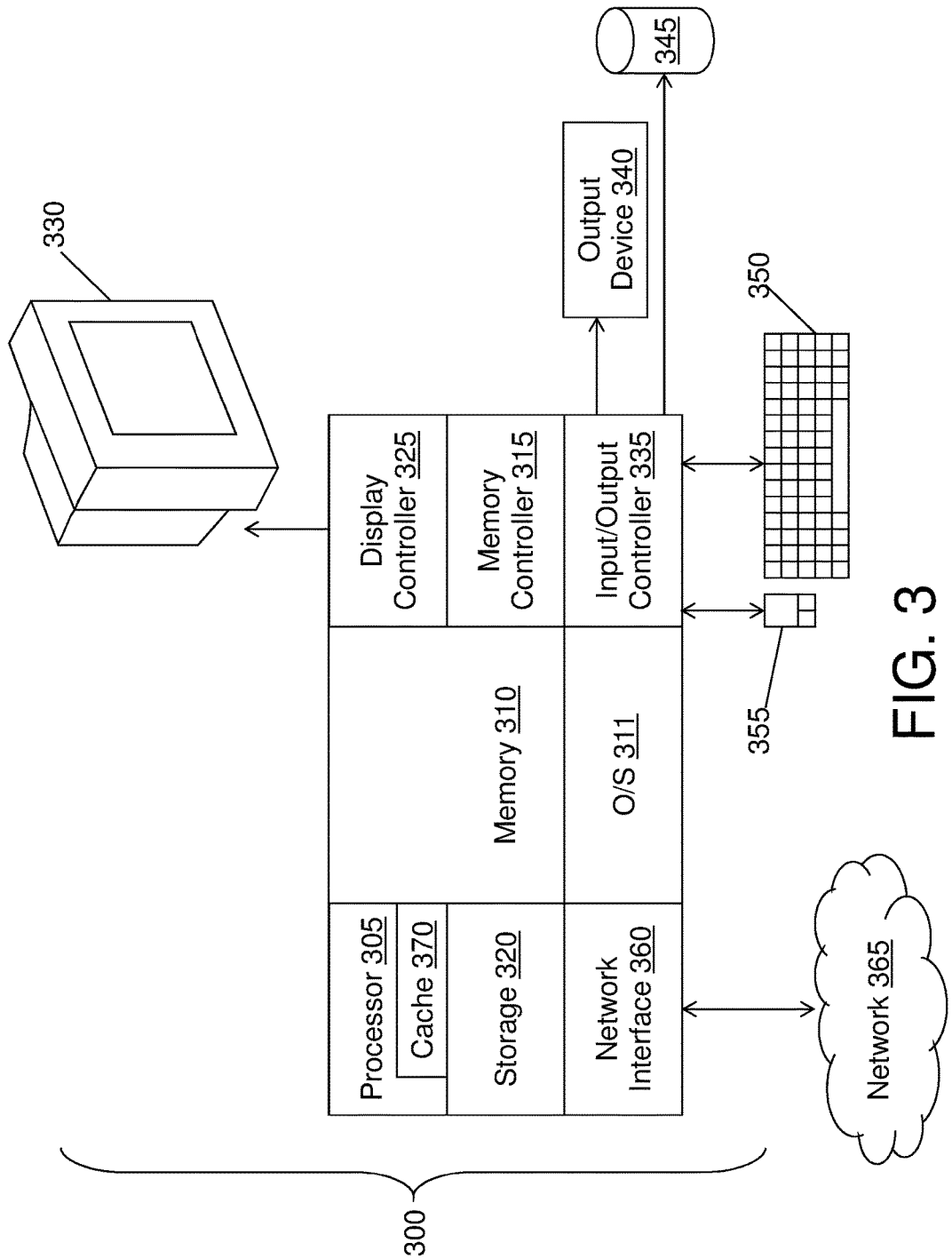
FIG. 3 is a block diagram of a computer system for implementing some or all aspects of the request system, according to some embodiments of this invention.

FIG. 3 is a block diagram of a computer system 300 for implementing some or all aspects of the request system 100, according to some embodiments of this invention. The request systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For example, and not by way of limitation, the hardware accelerator 110 may be integrated with, or installed in, a computer system 300, which acts as its host machine.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a CPU, an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the request systems 100 and methods of this disclosure.

The computer system 300 may further include a display controller 325 coupled to a display 330. In some embodiments, the computer system 300 may further include a network interface 140 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Request systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    setting a respective flag in a first buffer of a hardware accelerator, wherein the first buffer comprises the respective flag of the first buffer, and wherein a second buffer of the hardware accelerator comprises a respective flag of the second buffer;
    maintaining a hardware state of the hardware accelerator in the first buffer, based on the respective flag of the first buffer being set;
    receiving a first request directed to the hardware accelerator;
    determining that the first buffer has the respective flag set; and
    passing the first request to the hardware accelerator, wherein the passing the first request comprises passing to the hardware accelerator a pointer to the first buffer, based on the first buffer having the respective flag set.

2. The computer-implemented method of claim 1, wherein the first buffer is a current input buffer for the first request, wherein the second buffer is a current output buffer for the first request, and wherein the hardware accelerator writes a resulting software state to the current input buffer responsive to executing the first request.

3. The computer-implemented method of claim 1, wherein:
    the first buffer is a current input buffer for the first request;
    the second buffer is a current output buffer for the first request;
    responsive to executing the first request, the hardware accelerator writes a resulting software state to the current output buffer; and
    the computer-implemented method further comprises swapping the current input buffer and the current output buffer at a conclusion of the first request, wherein the first buffer becomes the current output buffer and the second buffer becomes the current input buffer.

4. The computer-implemented method of claim 3, wherein:
the first buffer is a current output buffer for a next request;
the second buffer is the current input buffer for the next request; and
the computer-implemented method further comprises:
receiving a second request as the next request for the hardware accelerator;
determining that the first buffer has the respective flag set; and
passing the second request to the hardware accelerator, wherein the passing the second request comprises passing to the hardware accelerator a pointer to the first buffer, based on the first buffer having the respective flag set.

5. The computer-implemented method of claim 3, wherein the first buffer is a current output buffer for a second request, wherein the second buffer is the current input buffer for the second request, and wherein the hardware accelerator writes a resulting software state to the current input buffer responsive to executing the second request.

6. The computer-implemented method of claim 1, wherein a software state of the hardware accelerator is moveable between the first buffer and the second buffer, and wherein the hardware state of the hardware accelerator is fixed in the first buffer.

7. The computer-implemented method of claim 1, wherein the hardware accelerator supports a restartable request.

8. A system comprising:
a memory having computer-readable instructions; and
one or more processors for executing the computer-readable instructions, the computer-readable instructions comprising instructions for:
setting a respective flag in a first buffer of a hardware accelerator, wherein the first buffer comprises the respective flag of the first buffer, and wherein a second buffer of the hardware accelerator comprises a respective flag of the second buffer;
maintaining a hardware state of the hardware accelerator in the first buffer, based on the respective flag of the first buffer being set;
receiving a first request directed to the hardware accelerator;
determining that the first buffer has the respective flag set; and
passing the first request to the hardware accelerator, wherein the passing the first request comprises passing to the hardware accelerator a pointer to the first buffer, based on the first buffer having the respective flag set.

9. The system of claim 8, wherein the first buffer is a current input buffer for the first request, wherein the second buffer is a current output buffer for the first request, and wherein the hardware accelerator writes a resulting software state to the current input buffer responsive to executing the first request.

10. The system of claim 8, wherein:
the first buffer is a current input buffer for the first request;
the second buffer is a current output buffer for the first request;
responsive to executing the first request, the hardware accelerator writes a resulting software state to the current output buffer; and
the computer-readable instructions further comprise instructions for swapping the current input buffer and the current output buffer at a conclusion of the first request, wherein the first buffer becomes the current output buffer and the second buffer becomes the current input buffer.

11. The system of claim 10, wherein:
the first buffer is a current output buffer for a next request;
the second buffer is the current input buffer for the next request; and
the computer-readable instructions further comprise instructions for:
receiving a second request as the next request for the hardware accelerator;
determining that the first buffer has the respective flag set; and
passing the second request to the hardware accelerator, wherein the passing the second request comprises passing to the hardware accelerator a pointer to the first buffer, based on the first buffer having the respective flag set.

12. The system of claim 10, wherein the first buffer is a current output buffer for a second request, wherein the second buffer is the current input buffer for the second request, and wherein the hardware accelerator writes a resulting software state to the current input buffer responsive to executing the second request.

13. The system of claim 8, wherein a software state of the hardware accelerator is moveable between the first buffer and the second buffer, and wherein the hardware state of the hardware accelerator is fixed in the first buffer.

14. The system of claim 8, wherein the hardware accelerator supports a restartable request.

15. A computer-program product for executing requests on a hardware accelerator, the computer-program product comprising a computer-readable storage medium having program instructions embodied therewith, the program instructions executable by a processor to cause the processor to perform a method comprising:
setting a respective flag in a first buffer of a hardware accelerator, wherein the first buffer comprises the respective flag of the first buffer, and wherein a second buffer of the hardware accelerator comprises a respective flag of the second buffer;
maintaining a hardware state of the hardware accelerator in the first buffer, based on the respective flag of the first buffer being set;
receiving a first request directed to the hardware accelerator;
determining that the first buffer has the respective flag set; and
passing the first request to the hardware accelerator, wherein the passing the first request comprises passing to the hardware accelerator a pointer to the first buffer, based on the first buffer having the respective flag set.

16. The computer-program product of claim 15, wherein the first buffer is a current input buffer for the first request, wherein the second buffer is a current output buffer for the first request, and wherein the hardware accelerator writes a resulting software state to the current input buffer responsive to executing the first request.

17. The computer-program product of claim 15, wherein:
the first buffer is a current input buffer for the first request;
the second buffer is a current output buffer for the first request;

responsive to executing the first request, the hardware accelerator writes a resulting software state to the current output buffer; and the method further comprises swapping the current input buffer and the current output buffer at a conclusion of the first request, wherein the first buffer becomes the current output buffer and the second buffer becomes the current input buffer.

18. The computer-program product of claim 17, wherein:

the first buffer is a current output buffer for a next request;

the second buffer is the current input buffer for the next request; and the method further comprises:

receiving a second request as the next request for the hardware accelerator;

determining that the first buffer has the respective flag set; and passing the second request to the hardware accelerator, wherein the passing the second request comprises passing to the hardware accelerator a pointer to the first buffer, based on the first buffer having the respective flag set.

19. The computer-program product of claim 17, wherein the first buffer is a current output buffer for a second request, wherein the second buffer is the current input buffer for the second request, and wherein the hardware accelerator writes a resulting software state to the current input buffer responsive to executing the second request.

20. The computer-program product of claim 15, wherein a software state of the hardware accelerator is moveable between the first buffer and the second buffer, and wherein the hardware state of the hardware accelerator is fixed in the first buffer.

\* \* \* \* \*